United States Patent [19]

Adelson

[11] Patent Number: 5,076,687
[45] Date of Patent: Dec. 31, 1991

[54] OPTICAL RANGING APPARATUS

[75] Inventor: Edward H. Adelson, Cambridge, Mass.

[73] Assignee: Massachusetts Institute of Technology, Cambridge, Mass.

[21] Appl. No.: 574,417

[22] Filed: Aug. 28, 1990

[51] Int. Cl.⁵ .................................................. G01C 3/08
[52] U.S. Cl. ...................................... 356/4; 250/201.7; 250/201.8; 354/402
[58] Field of Search .............. 356/4; 250/201.7, 201.8; 354/402

[56] References Cited

U.S. PATENT DOCUMENTS

| | | | |
|---|---|---|---|
| 4,185,191 | 1/1980 | Stauffer . | |
| 4,230,941 | 10/1980 | Stauffer . | |
| 4,373,791 | 2/1983 | Araki . | |
| 4,414,470 | 11/1983 | Nakaoka . | |
| 4,644,148 | 2/1987 | Kusaka et al. | 250/201.8 |
| 4,945,407 | 7/1990 | Winnek | 358/88 |

OTHER PUBLICATIONS

"Fast and Reliable Passive Trinocular Stereovision", by Nicholas Ayache & Francis Lustman, 1987, pp. 422–427.
"Towards Real-time Trinocular Stereo", by Charles Hansen, Nicholas Ayache & Francis Lustman, 1988, pp. 129–133.
"An Iterative Image Registration Technique with an Application to Stereo Vision", by Bruce D. Lucas and Takeo Kanade, 1981, pp. 121–130.
"Three-Dimensional Imaging Techniques", by Takanori Okoshi, 1976, pp. 1–42 & 60–123.
"The Trinocular General Support Algorithm: A Three-Camera Stereo Algorithm for Overcoming Binocular Matching Errors", by Charles V. Steward & Charles R. Dyer, 1988, pp. 134–138.

Primary Examiner—Stephen C. Buczinski
Attorney, Agent, or Firm—Hamilton, Brook, Smith & Reynolds

[57] ABSTRACT

An optical ranging apparatus is provided which resolves the depth of objects in an object field of a main lens. Light is directed by the main lens to a lenticular array consisting of an array of lenticules each of which generates an image of the lens surface. Each of the generated images is directed to a photodetector array divided into macropixels each of which receives one of the lenticule images. Each macropixel is made up of a number of subpixels, each of which is a discrete photodetector element and generates an electrical signal proportional to the intensity of light upon it. A data processor receives the signals from the subpixels and assembles subimages, each of which consists of one subpixel from each macropixel. Each subimage represents a view of the entire object field through one portion of the main lens. The data processor determines depth of objects in the object field by comparing the parallax between subimages. A diffuser may be provided between the object field and the lenticular array to low pass filter light from the object field and reduce aliasing. A field lens may also be provided between the main lens and the lenticular array to redirect light from the main lens and prevent skewing of the light reaching the macropixels. The images from the lenticular array may be relayed to a photodetector array set back from the lenticular array by using a relay lens.

44 Claims, 6 Drawing Sheets

OPTICAL RANGING APPARATUS

BACKGROUND OF THE INVENTION

For performing an optical measurement of depth, it is frequently desirable to derive a range image, which represents the distances between a viewing point and various surfaces in a scene. Range images may be derived by active techniques in which some form of energy is directed toward an object and then measured on its return. Popular methods of active ranging include sonar, laser rangefinding, and structured light. Range images may also be derived by passive techniques, in which the light from a normally illuminated scene is captured and analyzed by one or more television cameras. Of the passive techniques, binocular stereo is the most popular.

There are many situations in which active techniques are inconvenient or ineffective in acquiring the desired range imagery. The most popular passive technique, binocular stereo, has a number of disadvantages as well. It requires the use of two cameras that are accurately positioned and calibrated. Analyzing the data involves solving the correspondence problem, which is the problem of determining the matches between corresponding image points in the two views obtained from the two cameras. The correspondence problem is known to be difficult and demanding from a computational standpoint, and existing techniques for solving it often lead to ambiguities of interpretation. The problems can be ameliorated to some extent by the addition of a third camera (i.e. trinocular stereopsis), but many difficulties remain.

The correspondence problem can also be avoided if one acquires a series of images from a series of closely spaced viewpoints, as is done in epipolar analysis. However, the procedure in this case is quite cumbersome, since a camera must move along a trajectory over an extended period of time in order to gather a sequence of images.

SUMMARY OF THE INVENTION

An optical depth resolver according to the present invention has a converging lens which receives light from objects in an object field. The lens directs the light to an image field of the converging lens where it is received by a plurality of imaging elements distributed about an image field of the converging lens. Each of the imaging elements receives light from the converging lens and forms an image from the light it receives.

The images from the imaging elements are received by a photodetector array which is divided into a plurality of macropixels, each of which is made up of a plurality of subpixels. Each macropixel of the photodetector array receives the image from one of the imaging elements, and each subpixel generates an electrical signal indicative of the intensity of light incident upon it.

Also provided with a preferred embodiment of the present invention is a data processor which receives the electrical signals from the subpixels and compares the relative intensities of different subpixels to establish the depth of objects in the object field relative to a focal plane of the converging lens. In an alternative embodiment of the present invention, the imaging elements are in the form of an array of pinhole cameras, each of which images light from the entire surface of the converging lens. However, the preferred embodiment uses a lenticular array. The lenticular array may have cylindrical lenses, but a two dimensional array using spherical lenses arrayed in a rectangular or hexagonal lattice is preferred.

A diffuser positioned between an object being imaged and the imaging elements is also provided in the preferred embodiment. The diffuser acts as a low pass filter to reduce aliasing. A field lens is also used, and is positioned between the converging lens and the imaging elements. The field lens redirects the light from the converging lens such that it appears to be focused from infinity. A relay lens may also be used between the imaging elements and the photodetector array. The relay lens forms an image of the light imaged by the imaging elements onto a screen. The relay lens relays the image from the screen to the photodetector array which can be set back from the imaging elements.

DETAILED DESCRIPTION OF THE PREFERRED EMBODIMENTS

Figures 1, 2:
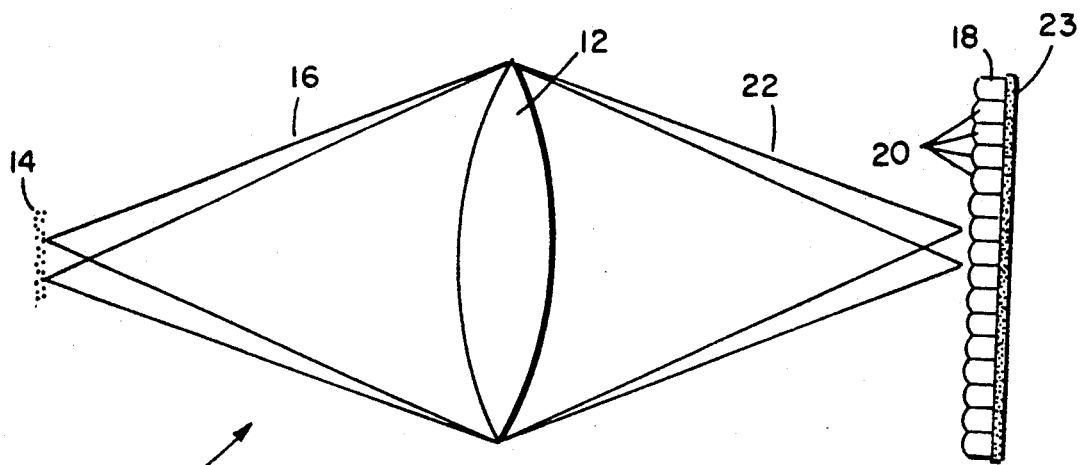
FIG. 1 illustrates an optical ranging apparatus according to the present invention.
FIG. 2 shows a CCD array and a preferred form of partitioning the array for the present invention.

Shown in FIG. 1 is an optical ranging apparatus 10 having a main converging lens 12 receiving light from an object 14 in an object field 16, and focusing the received light toward a lenticular array 18. The lenticular array is an array of lenses (lenticules 20) aligned adjacent one another in an image field 22 of the main lens 12. Each lenticule 20 of the lenticular array 18 forms an image from light received from the entire main lens 12 as seen from the location of that particular lenticule 20. Since each lenticule 20 is in a different region of image field 22 of the main lens 12, each lenticule images light from the entire surface of the main lens 12, but the light received by each lenticule is focused from a different portion of the object field 16. The object field 16 of the main lens 12 is an area from which light is received by the main lens 12 and directed toward the lenticular array 18. Similarly, the image field 22 is the area to which light received from the object field 16 is passed by the main lens 12.

Positioned behind the lenticular array 18 is an array of charge coupled devices (CCD array 23) which function as photodetectors. FIG. 2 depicts a portion of CCD array 23 and demonstrates how the CCD array is arranged for use in the present embodiment. The CCD array 23 consists of subpixels 24 each of which is a discrete photodetector and produces an output voltage proportional to the intensity of light incident upon it. The subpixels 24 are grouped in macropixels, each macropixel containing a finite number of subpixels 24. The macropixel regions of the CCD array are defined by the regions of the CCD array upon which the lenticule images are incident. The pixels of the CCD array which are encompassed by one lenticule image make up all the subpixels of one macropixel. In FIG. 2, the double-line borders in the figure signify the separation between different macropixels. Therefore, in the portion of array 23 shown in FIG. 2, each macropixel has nine different subpixels 24. It will be understood that the double lines shown in FIG. 2 may not exist on the surface of the CCD array 23 itself, but serve to illustrate how groups of subpixels 24 are preferably arranged for processing. In fact, the lenticular and CCD arrays may not be properly aligned, but compensation for such misalignments may be provided by the data processing.

Since each macropixel of the CCD array is positioned behind one of the lenticules 20 of the lenticular array 18, each of the macropixels receives an image which contains light passed by the entire main lens 12. However, the light received by each macropixel is received from a different angular position relative to the optic axis of the main lens 12. In the embodiment of FIG. 1, the object 14 is shown as being perpendicular to the optic axis of the main lens 12, and in a plane of focus. Thus, any point along the surface of the object 14 is imaged by the main lens to be in focus at the lenticular array 18. Because of this focusing, the light directed from any point on the object 14 is received by only one of the lenticules 20 of the lenticular array 18, and there is no overlap of light between lenticules. If, however, objects in the object field 16 of the main lens 12 are displaced relative to the focal plane of the lens 12, these objects do not come to a focus at the lenticular array 18, and light from the same portion of the object field may be received by more than one adjoining lenticule 20.

Figure 3A:
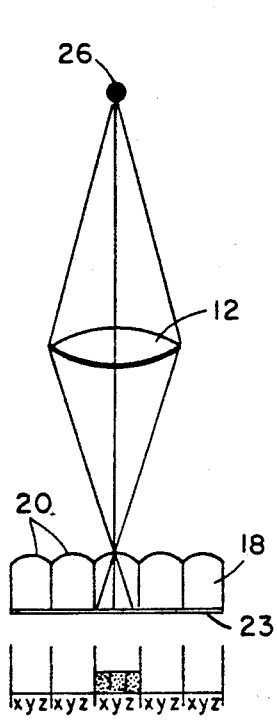
FIGS. 3A-3C illustrate the imaging of a point object by the present invention, when the object is in different regions of the object field.
Figure 3B:
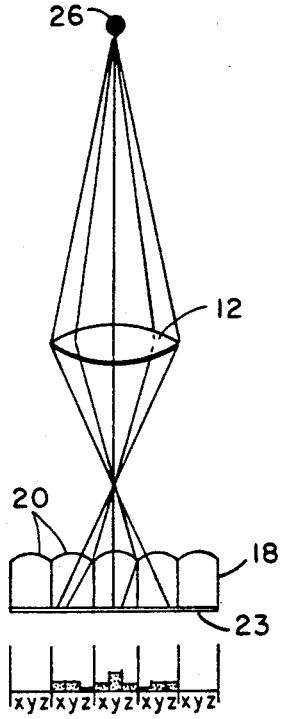
Figure 3C:
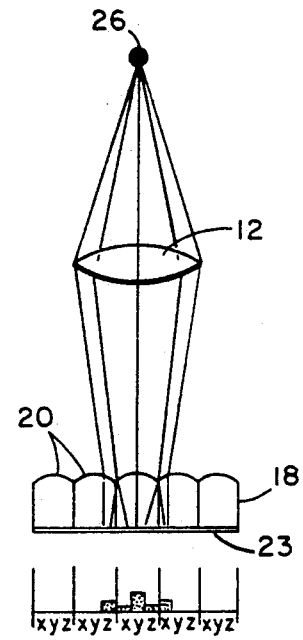

FIG. 3A shows main lens 12 having a point object 26 in a focal plane of the lens 12. As shown, the light from the object 26 comes to a focus at the lenticular array 18, and is therefore contained in only one lenticule 20. The bar graphs along the bottom of each of FIGS. 3A, 3B, and 3C show the relative intensities of light received by each of three subpixels across one dimension of the macropixels of the CCD array 23. This dimension is in the direction shown perpendicular to the optic axes of the lenses of the lenticular array 18. As shown in FIG. 3A. the focusing of the light from the point object at the lenticular array 18 causes all the light received from the object to enter the center lenticule shown in the figure. Within the center lenticule, the light is evenly dispersed across all three horizontal subpixel locations of the center macropixel.

The object 26 is shown again in FIG. 3B, but is beyond the plane of focus in the object field. This causes the light from object 26 to come to a focus before reaching the lenticular array 18. Thus, the light diverges past the focal point and "spills over" into the lenticules 20 adjacent the center lenticule. This "spillover" causes intensity distributions to be recorded in the macropixels adjacent the macropixel of the center lenticule. As can be seen from the bar graph of FIG. 3B, each of the intensity distributions of the macropixels receiving light has an intensity peak in one of its subpixels. The locations of the intensity peaks in the macropixels of the array 23 and the overall intensity distributions give information as to the location of the object 26 in the object field of the main lens.

In FIG. 3C, the point object 26 is closer to the main lens 12 than the focal plane of the lens 12. This causes the focus of the lens 12 in the image plane to be beyond the lenticular array 18, and the light from object 26 does not come to a focus before reaching the array 18. Like the FIG. 3B example, this causes overflow of light into the lenticules adjacent the center lenticule. However, since the converging light has not yet come to a focus upon reaching the lenticular array 18, the distribution of the light from different subpixels is different than the distribution resulting from the object being farther from the main lens 12 than the plane of focus (as in FIG. 3B). Specifically, for objects near the optic axis of the main lens 12, the intensity tends to be greatest at the subpixels closest to the central lenticule in FIG. 3C, and tends to be greatest at the subpixels away from the central lenticule in FIG. 3B. Further from the optic axis there is a shift in the distribution unless a field lens is used as described below.

Each of the subpixels across the dimension shown in FIGS. 3A-3C is labelled x, y, or z according to its location within a particular macropixel. Each of the subpixels x, y, and z corresponds to the light received through a different portion of main lens 12. The particular macropixel in which the subpixels x, y, and z are located determines the region of the object field from which the light originates. Thus, the number of lenticules determines the spatial resolution of the received images. The number of subpixels per macropixel determines the number of different "views" through the main lens 12, or the "motion resolution" or "parallax resolution" of the image at the CCD array. Each view through the lens is from a different angle, each subpixel group corresponding to one angle.

Figure 4A:
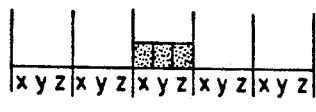
FIGS. 4A-4C demonstrate typical CCD sensor outputs for the imaging tasks of FIGS. 3A-3C, respectively.
Figure 4B:
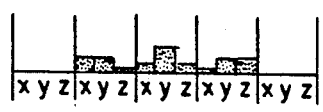
Figure 4C:
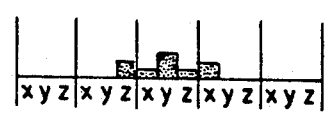

To determine the position of an object in the object field of main lens 12, the subpixels of the CCD array are compared. FIGS. 4A-4C show the bar graphs from FIGS. 3A.3C, respectively. Underneath the bar graph, in each of the figures, the intensity output for each of the subpixels x, y, and z is shown separately. If each of the subpixels of one type (e.g. x, y, or z) is assembled into a subimage, the result is three separate subimages, each representing a view through a different portion of main lens 12. Thus, each subimage is a view of the entire object field as seen through a different "viewing aperture" of the main lens 12. By selecting all the x subpixels, a virtual aperture through the right side of the lens is selected. By selecting all the z subpixels, a virtual aperture through the left side of the lens is selected.

As shown in FIG. 4A, a point object in the focal plane of the main lens results in light being received in the subpixel groups x, y, and z in equal portions and only in the center macropixel. Thus, if one were to display the subimages of that point in sequence as an animation, the point would remain stationary. In FIG. 4B (corresponding to FIG. 3B), it is shown that the intensity peaks output by subpixels of the subimages vary as the viewing aperture is changed from the x subimage to the y subimage, and vary further as the aperture is changed from the y subimage to the z subimage. Peaks to the left of center (in the orientation shown in FIG. 4A) decrease as the viewing aperture is changed from x to y to z (i.e. from left to right). However, the peaks to the right of center increase as the viewing aperture changes from the x subimage to the y subimage to the z subimage. Described in a different manner, the location of the highest peak in the subimages shifts from left to right as the viewing apertures are changed from x to y to z. If viewed sequentially, a point somewhat out of focus (spreading across plural macropixels) would move from left to right with changing angle of view.

In FIG. 4C (corresponding to FIG. 3C), left-of-center peaks increase in intensity when the viewing aperture changes from left to right (x subimage to z subimage). Similarly, the right-of center peaks decrease in intensity when the viewing aperture changes from left to right. Thus, the location of the highest peak in the subimages shifts from right to left as the viewing apertures are changed from x to y to z.

From the above it can be seen that the changing of peak intensities is opposite depending on whether the object 26 is behind or in front of the focal plane of the main lens 12. Therefore, from detecting how these intensities change across the surface of the CCD array, an indication of the depth of the object in the object field can be obtained.

Within a single macropixel receiving an image from a lenticule 20, each subpixel 24 detects light from a different portion of the main lens 12. The subimages, when assembled, therefore appear as views of objects in the object field from different angles. The parallax between each of the subimages gives information on the depth of objects in the object field. When the subimages are viewed sequentially, the intensity differences appear as relative position changes of objects depicted in the images.

Because of the change in viewing apertures, the depth of other objects in the object field may be determined by how much parallax exists relative to the focal plane of the main lens 12. The more an object appears to change position from one image to the next, the farther it is from the focal plane. Objects farther from the main lens 12 than the focal plane appear to change position toward the left when viewing the images in the order of left subpixel image through right subpixel image (x subimage through z subimage). Conversely, objects closer to the main lens 12 than the focal plane appear to change position toward the right if the same viewing order is used.

The multiple image example discussed above is illustrative of the capabilities of the present invention to establish depths of objects in an object field. The number of subpixels across one dimension of a macropixel gives the "parallax resolution" of the apparatus (how many different viewing angles are obtained). The number of macropixels across one dimension of the array determines the "spatial resolution" of the apparatus in that direction (the number of different components into which the image plane is broken across that dimension). Although the system may be used to generate a sequence of images for the purpose of presenting a scan of the object field, as suggested above, the data acquired from may also be used directly for the ranging of an object in the object field.

Figures 5A, 5B:
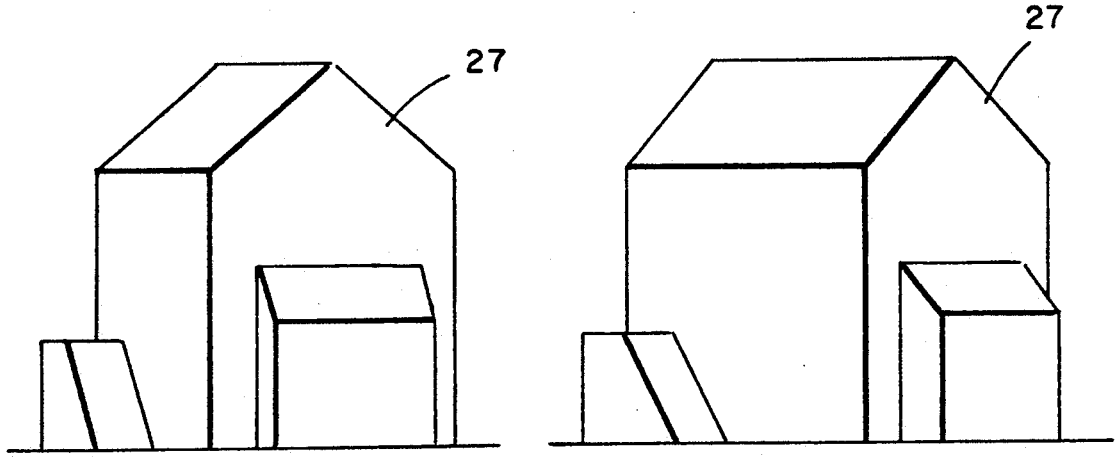
FIG. 5A is an illustration of a first subimage formed by the present invention.
FIG. 5B is an illustration of a second subimage formed by the present invention.
Figure 5C:
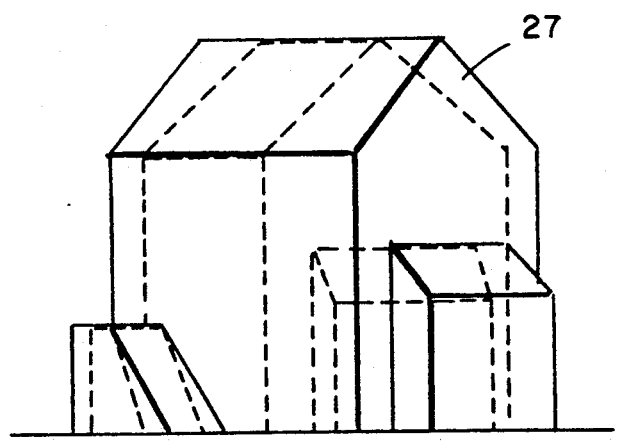
FIG. 5C is an illustration of the subimage of FIG. 5A overlayed on the image of FIG. 5B.

FIGS. 5A and 5B show two different views of an object 27 representative of two different subimages. The view of FIG. 5A might be an "x" subimage received by the system of FIG. 1, while the view of FIG. 5B might be a "z" subimage received by the system of FIG. 1. The subimage of FIG. 5A is an image as seen through the right side of the main lens, while the image of FIG. 5B is an image as seen through the left side of the main lens. The focal plane of the main lens is somewhere near the center of the object 27, and one view, relative to the other, therefore appears as a rotation of the object 27 about an axis passing through the center of the object 27. FIG. 5C shows the image of FIG. 5A overlayed on the image of FIG. 5B, demonstrating the relative displacement changes from one view to another of portions of the depicted object 27. These displacement changes are identified during processing of the images, and are used in establishing measurements of relative depth.

Figure 6A:
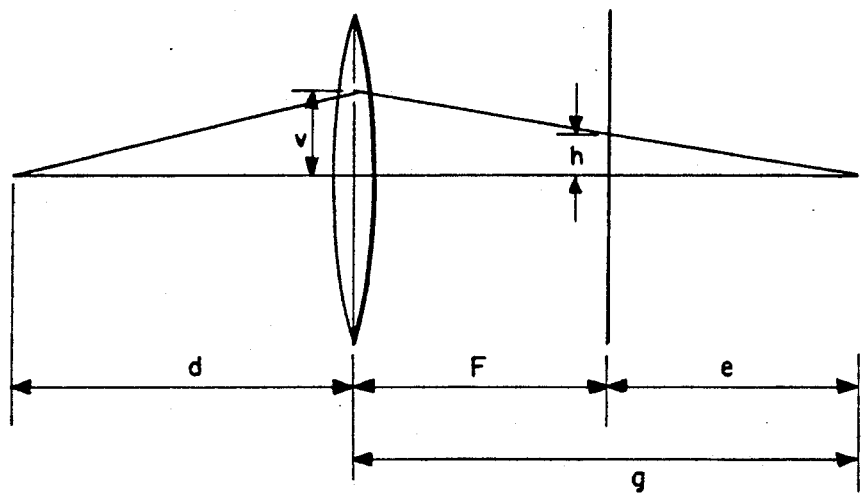
FIG. 6A shows the geometry for a main lens focused on infinity as used with the present invention.

One example of a technique for determining the depth of an object in the object field of main lens 12 can be described using FIG. 6A. Main lens 12 is focused on infinity, and has a focal length F. An object in the object field of the lens 12 is at a distance d from a plane of the lens. An image of the object forms at a distance g, where:

$$1/d = 1/F - 1/g \qquad (1)$$

By similar triangles, $$e/h = g/v, \qquad (2)$$

where v is the known aperture displacement determined by the number of subpixels in a macropixel, h is the measured image displacement of the object, and e equals the distance $(g-F)$. Therefore, $$(g-F)/h = g/v \qquad (3)$$

or $$g - F = gh/v \qquad (4)$$

rearranging, $$F = g - gh/v \qquad (5)$$

or, $$F = g(1 - h/v) \qquad (6)$$

therefore, $$1/g = (1/F)(1 - h/v) \qquad (7)$$

substituting into equation (1), $$d = Fv/h \qquad (8)$$

Therefore, by knowing F and v, and measuring h, the distance d can be calculated.

Figure 6B:
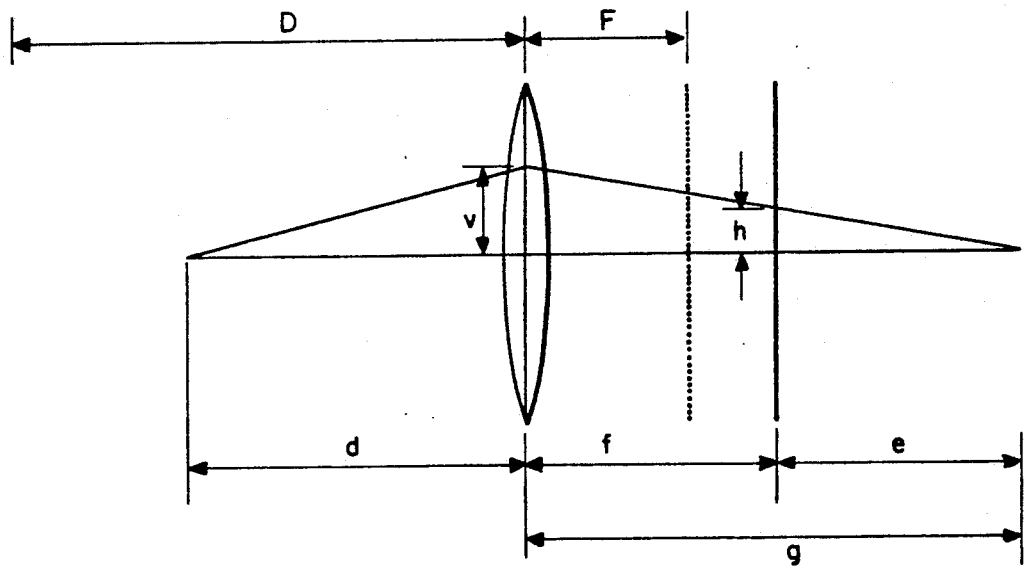
FIG. 6B shows the geometry for a main lens focused at a distance D as used with the present invention.

In the case of a lens focused on a plane at a distance D, a distance calculation is made using the diagram of FIG. 6B. The lens of FIG. 6B has the following characteristics:

F = focal length
f = distance to lenticular array
D = distance at which lens is focused
d = distance of object plane
g = distance of image plane
e = distance of image plane beyond lenticular array
v = viewing position of aperture
h = displacement of object ray By similar triangles, $$h/e = v/g \quad (9)$$

Since $e = g - f$, $$h/(g-f) = v/g \quad (10)$$

or $$g - f = gh/v \quad (11)$$

rearranging, $$f = g - gh/v \quad (12)$$

or $$f = g(1 - h/v) \quad (13)$$

therefore, $$g = f/(1 - h/v) \quad (14)$$

or $$1/g = (1/f)(1 - h/v) \quad (15)$$

By the lens equation, $$1/F = 1/g + 1/d \quad (16)$$

Substituting eq. (15) into eq. (16), $$1/d = 1/F - 1/f(1 - h/v) \quad (17)$$

Using the relation $$f = Dh/v \quad (18)$$

eq. (17) may be put in terms of D, such that it reduces to the following:

$$1/d = h/Fv - (1/D)(1 - h/v) \quad (19)$$

or $$1/d \times (h/v)(1/F - 1/D) + 1/D \quad (20)$$

Thus, knowing F, v, and D, and measuring h, the distance d to a point on an object may be found.

In a preferred embodiment of the invention, lenticular array is used which has a two dimensional array of lenses to provide image data in each of two different dimensions. A CCD sensor such as that of FIG. 2 is used, and the image from one of the lenses of the lenticular array is distributed across all of the subpixels of a particular macropixel. Thus, each macropixel is given a number of different virtual apertures of the lens in each of the two dimensions of the array. In the array shown in FIG 2, all of the subpixels labelled xx are assembled into one subimage, all the subpixels labelled xy are arranged into a subimage, etc. In this manner, nine separate subimages are assembled, each of which consists of light having passed through a different region of main lens 12.

A preferred embodiment, such as mentioned above, is shown graphically in FIG. 7. Main lens 12 is receiving light from an object 30 in the object field of the lens 12, and passing that light through to the image field of the lens 12. Located in the image field between the main lens 12 and lenticular array 32 is a field lens 34 which adjusts the focused light from the main lens such that it appears to have been focused from infinity. The absence of such a field lens 34 causes the light received by the CCD array 23 of FIGS. 3A-3C to be skewed across the surface of the subpixels in each macropixel. Therefore the center of the lenticule image (and therefore the center of the macropixel) are displaced relative to the CCD array 23. Thus, subpixels on one side of a macropixel may be overly illuminated due to the light being converging or diverging. The effects of such skewing are predictable and may be compensated for with processing techniques. However, the field lens removes the need for the additional processing by providing an optical solution.

Figure 7:
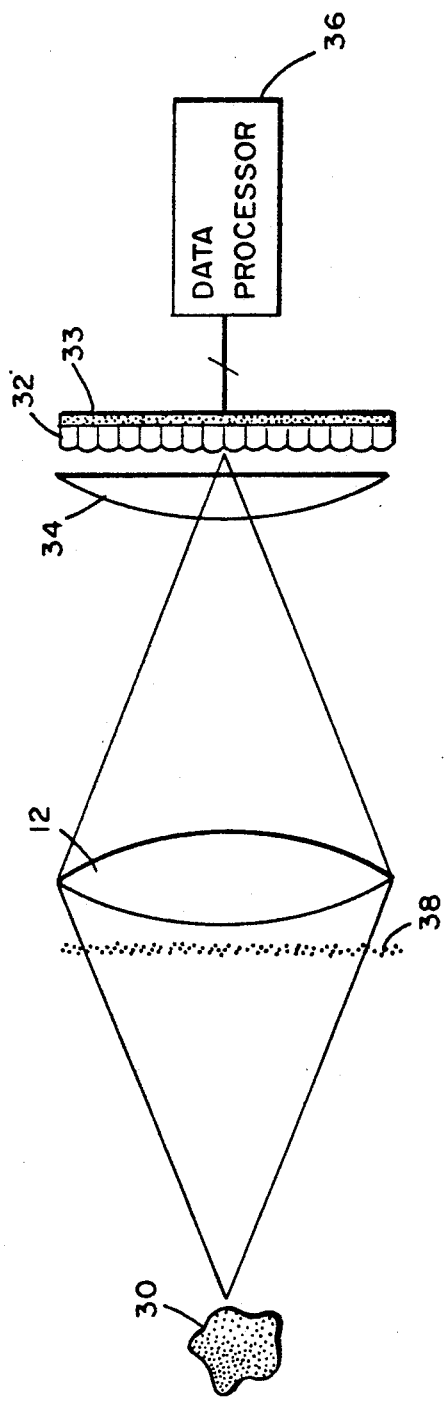
FIG. 7 shows a preferred embodiment of the ranging apparatus of the present invention.

The lenticular array 32 of FIG. 7 is a two dimensional lens array of spherical lenses, and therefore allows two dimensional motion analysis from the acquired subimages. In this embodiment, the lenses of the array are arranged in a rectangular lattice. However, a hexagonal or other type of lattice arrangement may be used as an alternative. The CCD array 33 is somewhat like the CCD array 23 of FIG. 1, and serves as an input to data processor 36, shown in block diagram form. Also included with the embodiment of FIG. 7 is a weak diffuser element 38 which diffuses the light from the object prior to its reaching the lenticular array 32. Without the diffuser, problems with aliasing might arise. Since the spatial resolution of the apparatus is determined by the number of lenticules, so is the sampling "frequency". If light from depth changes in the object field falls within an area which is smaller than the area of the object field from which light is received by a single lenticule, accurate resolution of the depth change can not be accomplished. In other words, not enough samples exist to properly resolve the depth change and aliasing results (i.e. no useful information is provided about depth in that region).

Diffuser 38, however, helps control aliasing by dispersing the light received from the object field, thereby acting as a "low pass filter". Some common examples of diffusers are glass elements with random surface variations or diffracting optics. A weak, lenticular array may also be used. If a one dimensional lenticular array 32 (cylindrical lenses) is used, a one dimensional diffuser 38 may also be used, since only one dimension of depth changes need be resolved. In any event, the diffuser should ideally be in the aperture plane, and make a point spread function (PSF) of about 1 lenticule width.

As mentioned above, the lenticular array may be selected to be one dimensional (cylindrical) or two dimensional. A one dimensional array has better resolution, but only one direction of parallax. A two dimensional array may be used which consists of spherical lenses instead of cylindrical lenses. Such an array is preferably arranged in a rectangular or hexagonal lattice. Such two dimensional screens are commercially available, or may be constructed by crossing two cylindrical screens. On any lenticular array, a finer array means better spatial resolution, but fewer viewpoints (subimages).

Figure 8:
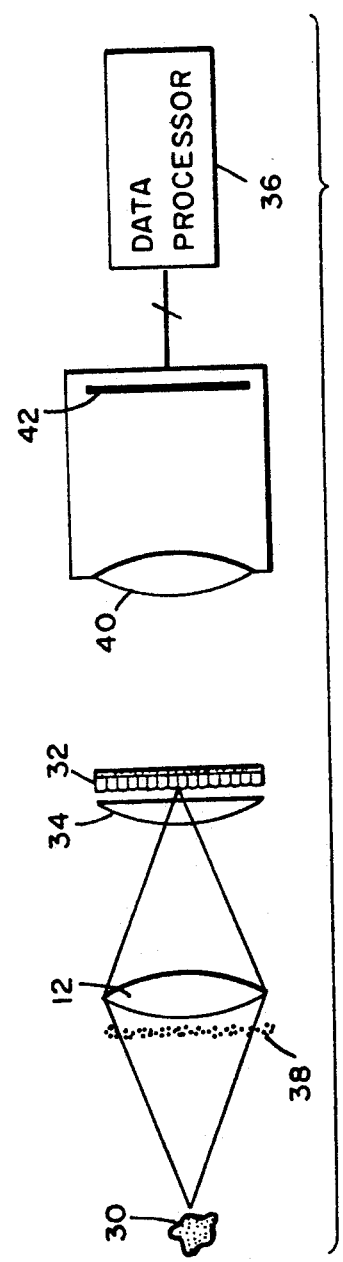
FIG. 8 an alternative embodiment of the ranging apparatus of FIG. 6 having a relay lens.

One alternative embodiment of the present invention uses a relay lens to reimage the lenticular image onto a distant sensor array. Such an arrangement is shown in FIG. 8. Object 30 is shown being imaged by main lens 12 through diffuser 38. Light from the main lens 12 is passed through field lens 34 and onto lenticular array 32. However, instead of imaging immediately onto a CCD array, the image formed on the rear surface of the lenticular array is viewed by relay lens 40 which focuses the lenticular image onto photodetector array 42. An optional piece of ground glass may be provided on the back of the lenticular array in on which a clear image may be formed. The combination of relay lens and photodetector array 42 might be in the form of a television camera assembly. This system allows more flexibility in how the images from the lenticular array are dispersed across the photodetector array 42. However, additional optics are required and the relative positioning of the elements make the system less stable.

The present invention is unique in that it records a single monocular image, and uses that single image to calculate the depth of objects in the object field. Once the image is detected by the CCD array, the processing of the information is performed by a data processor. The data processor uses image processing techniques, many of which are standard in the art of image processing. The following is a list of steps which may be followed in a preferred embodiment of the present invention to accomplish the accurate processing of the acquired image information.

Processing of the Image Data

Figure 9:
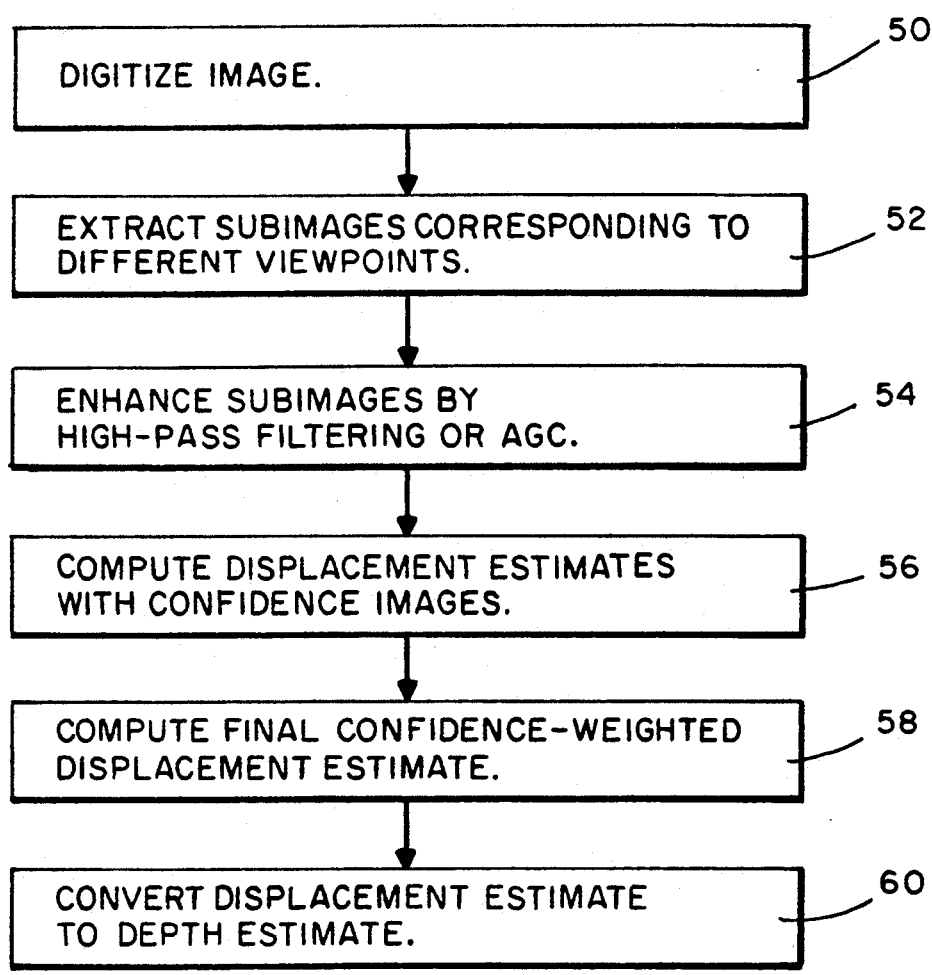
FIG. 9 is a flowchart showing the image processing steps of the present invention.

A number of different processing methods may be used to extract depth information from the recorded image data. The preferred embodiment uses a sequence of general steps which are shown in the blocks of the flowchart of FIG. 9. First the image received by the CCD array is digitized (block 50). The intensity of the light received by each pixel of the CCD array results in the generation of an analog voltage which is converted to a digital code by an analog-to-digital (A/D) converter. The number of quantization levels available with the A/D converter depends on how many bits are used to represent each pixel. This in turn determines the number of distinct grey levels which are recognized by the data processor.

After digitization, the subimages corresponding to different viewpoints are extracted (block 52). For this step, the image is multiplied by a weighting mask to select individual subimages. Preferably, the lenticular array is aligned with the CCD array such that the image from each lenticule is evenly distributed across one macropixel, therefore encompassing an even number of subpixels. In such a case, a mask is defined which, for each macropixel, multiplies all the subpixels by zero except for the subpixel corresponding to the desired subimage. For each different subimage, a different subpixel for each macropixel is selected. Thus, for each position, the mask blocks out all but one set of subpixels, such that each subimage consists of one subpixel from each macropixel. Each subimage therefore represents a different virtual aperture position (viewing light from a different portion of the lens).

In some cases, the lenticular array may not be exactly aligned with the CCD array, and a weighting and averaging technique is used to generate the desired subimages. In this case, it is not possible to generate the subimage by selecting individual pixel values, because the effective position of the desired pixel may lie at a fractional position between CCD elements. Therefore, it is necessary to estimate the value of the virtual pixel at a fractional position. This can be achieved by taking a weighted average of the observed pixels surrounding the virtual pixel and using well known interpolation techniques such as bilinear interpolation.

Once the desired subimages are assembled, each subimage is enhanced through well known image processing techniques (block 54). In the preferred embodiment, this enhancing includes preprocessing the subimages to remove low-spatial-frequency variation that may result due to non-uniformity in the optical system or sensor sensitivity. This may be accomplished with a broadband high-pass filter which, for each pixel of a subimage, subtracts a local average of image intensity taken from surrounding pixels. Alternatively, a local automatic gain control process may be used which divides regions of the subimage by a local average.

Displacement analysis is then performed (block 56) to measure object displacement between image pairs. This analysis uses techniques typically used for motion analysis or stereo analysis. One possible technique is to perform a least-squares match as commonly understood in the art of image processing. Such a least-squares matching technique is demonstrated by Lucas and Kanade in *An Iterative Image Registration Technique with an Application to Stereo Vision*, Proceedings of Image Understanding Workshop, April 1981, pp. 121–130. Using this technique, the displacement estimate is given by:

$$\Sigma[I_x I_\mu]/\Sigma[(I_x)^2],$$

where $I_x$ is the spatial derivative of the image intensity in the x direction and $I_\mu$ is the derivative of intensity as the viewing position is moved in the x direction of the aperture. Summation is taken over a small spatial patch within the image. Larger patches lead to estimates with reduced noise but tend to smooth out sharp changes in displacement. The output using this technique is an image with a displacement estimate at each position. Following the above least squares method, a confidence factor of $\Sigma[(I_x)^2]$ may also be assigned to each local estimate.

In processing the image data in two dimensions, the previously mentioned least squares technique, described for subimages in one dimension, can similarly be used for subimage data in a second dimension. Once this is complete, the final confidence-weighted estimates are computed (block 58). Displacement estimates are extracted for all adjacent image pairs. On the assumption that the magnitude of the displacements in one dimension should equal the magnitude of the displacements in the second dimension, all of the displacement estimates in both dimensions are combined into a single displacement estimate. This is accomplished by weighting each displacement image by its corresponding confidence image.

Once a final displacement estimate is acquired, the displacement estimate is converted to a depth estimate (block 60) using the geometry shown in FIGS. 6A and 6B. This depth estimate output is then applied to the particular application for which the invention is being used.

One processing consideration which arises in practicing the present invention is the alignment of the desired macropixels with the actual subpixels of the photodetector array. In the aforementioned case of the lenticular array not lining up evenly with the subpixels of the CCD array, it is necessary to generate a weighting mask to be used during processing. The following is a preferred method for generating such a mask.

A uniformly illuminated white card is first placed in front of the main lens in the object field. The aperture of the main lens is then reduced so that the macropixels include only a few sensor subpixels. The image is digitized, and the locations of the peaks in the macropixels are determined. A weighting mask is then defined in which the smooth weighting functions underneath each macropixel are centered on the correct center of the macropixel.

While the invention has been particularly shown and described with reference to a preferred embodiment thereof, it will be understood by those skilled in the art that various changes in form and details may be made therein without departing from the spirit and scope of the invention as defined by the appended claims. In particular, the specific processing techniques may vary depending on the application of the invention. The least squares method discussed above is but one image processing technique understood by those skilled in the art. Furthermore, the lenticular array may be replaced by another form of imaging device such as a pinhole array. The photodetector array may also be a type of photodetector other than a CCD device.

The data which is gathered by the optical system may be processed for various purposes. For example, the data can be applied to a three dimensional display. The subimages may be viewed individually or sequentially to provide two dimensional projections from different angles. The range data obtained from processing the subimages may be used to identify objects in the object field. A system using such a ranging technique may also be used for such applications as setting off security alarms or for automatic navigation (obstacle avoidance).

I claim:

1. An optical depth resolver, comprising:
   a converging lens receiving light from objects in an object field and directing the received light to an image field of the converging lens;
   a plurality of imaging elements distributed about the image field of the converging lens in the image field of the lens such that each imaging element receives light from the converging lens and forms an image from the light it receives;
   a photodetector array divided into a plurality of macropixels each of which is made up of a plurality of subpixels, each macropixel receiving an image formed by one of the imaging elements such that each subpixel of a macropixel receives light from one portion of the lens as imaged by one of the imaging elements, each subpixel generating an electrical signal indicative of the intensity of light incident upon it; and
   a data processor receiving the electrical signals from the subpixels and processing the signals from different subpixels, the data processor identifying subimages of subpixels having like spatial positions within different macropixels and performing, across the image field, a plurality of local displacement estimates of image displacement between subimages, to create a range image of depths of objects across the object field.

2. An optical depth resolver according to claim 1 wherein the plurality of imaging elements comprises a lenticular array.

3. An optical depth resolver according to claim 2 wherein the lenticular array comprises an array of cylindrical lenses.

4. An optical depth resolver according to claim 2 wherein the lenticular array comprises an array of spherical lenses.

5. An optical depth resolver according to claim 4 wherein the spherical lenses are arrayed in a rectangular lattice.

6. An optical depth resolver according to claim 1 wherein each of the imaging elements receives light from the entire surface of the converging lens.

7. An optical depth resolver according to claim 1 wherein the photodetector array is a CCD array.

8. An optical depth resolve according to claim 1 wherein each subimage is representative of light passing through a different region of the converging lens.

9. An optical depth resolver according to claim 8 wherein the data processor assembles the subimages and compares the parallax from one subimage to another in determining depth of objects in the object field.

10. An optical depth resolver according to claim 8 wherein the shift of intensity peaks from one subimage to another is detected by the data processor and used determining depth of objects in the object field.

11. An optical depth resolver according to claim 1 wherein there is one macropixel for each image generated by an imaging element.

12. An optical depth resolver according to claim 1 wherein the data processor runs a least squares processing method in making determinations of depth of objects in the object field.

13. An optical depth resolver according to claim 1 further comprising a weak diffuser which diffuses the light from objects in the object field prior to the light being received by the imaging elements.

14. An optical depth resolver according to claim 13 wherein the diffuser is a piece of glass with random surface variations.

15. An optical depth resolver according to claim 1 further comprising a field lens positioned between the converging lens and the imaging elements, and redirecting the light from the converging lens such that the light from the converging lens appears to have been focused from infinity.

16. An optical depth resolver according to claim 1 further comprising a relay lens between the imaging elements and the photodetector array, the relay lens redirecting the images from the imaging elements to the photodetector array.

17. An optical depth resolver according to claim 16 wherein the relay lens refocuses the images generated by the imaging elements.

18. An optical depth resolver according to claim 17 wherein the distribution of the images from the imaging elements across the surface of the photodetector array is controlled by the focusing of the relay lens.

19. An optical depth resolver according to claim 16 wherein the relay lens is part of a television camera.

20. An optical depth resolver as claimed in claim 1 wherein the data processor estimates are based on derivatives of local intensity between subimages for patches of macropixels.

21. An optical depth resolver as claimed in claim 20 wherein the estimates are based on derivatives in two dimensions.

22. An optical depth resolver as claimed in claim 1 wherein the data processor applies a weighting mask to the electrical signals generated by the photodetector array in order to adjust the signals for misalignment of the imaging elements with the photodetector array.

23. An optical depth resolver as claimed in claim 1 wherein the data processor processes subpixels of at least three subimages in performing each local displacement estimate.

24. An optical depth resolver comprising:
a converging lens receiving light from objects in an object field and directing the received light to an image field of the converging lens;
a lenticular array having a two dimensional array of lenticules distributed about the image field of the converging lens such that each lenticule receives light directed from a different portion of the object field and receives the directed light at a different angle relative to an optic axis of the main lens, each lenticule forming an image from the light it receives;
a photodetector array divided into a plurality of macropixels each of which is made up of a plurality of subpixels, each macropixel receiving the image formed by one of the lenticules such that each subpixel of a macropixel receives light from one portion of the converging lens as imaged by one lenticule, each subpixel generating an electrical signal indicative of the intensity of light incident upon it;
a data processor receiving the electrical signals from the subpixels and processing the subpixel signals to detect variations in intensity of light directed from a plurality of locations in the object field relative to the portion of the converging lens through which the light passes, the data processor identifying subimages of subpixels having like spatial positions within different macropixels and performing, across the image field, estimates of depths of objects across the object field based on local derivatives of intensity between subimages to create a range image.

25. An optical depth resolver according to claim 24 wherein the photodetector array is a CCD array.

26. An optical depth resolver according to claim 24 further comprising a weak diffuser diffusing light between the object field and the lenticular array.

27. An optical depth resolver according to claim 24 further comprising a field lens between the converging lens and the lenticular array, the field lens redirecting the light from the converging lens such that it appears to have been focused from infinity.

28. An optical depth resolver according to claim 24 further comprising a relay lens between the lenticular array and the photodetector array, the relay lens redirecting the images from the lenticular array to the photodetector array.

29. An optical depth resolver as claimed in claim 24 wherein the estimates are based on derivatives in two dimensions.

30. An optical depth resolver as claimed in claim 24 wherein the data processor applies a weighting mask to the electrical signals degenerated by the photodetector array in order to adjust the signals for misalignment of the lenticular array with the photodetector array.

31. An optical depth resolver as claimed in claim 24 wherein the data processor processes at least three subimages to perform each estimate.

32. A method of making depth measurements, comprising:
providing a converging lens receiving light from objects in an object field and directing the received light to an image field of the converging lens;
receiving said light from the converging lens with a plurality of imaging elements distributed about the image field of the converging lens, each imaging element forming an image from light it receives;
receiving the images formed by the imaging elements with a photodetector array divided into a plurality of macropixels each of which is made up of a plurality of subpixels, each macropixel receiving an image formed by one of the imaging elements such that each subpixel of a macropixel receives light from one portion of the lens as imaged by one of the imaging elements, each subpixel generating an electrical signal indicative of the intensity of light incident upon it; and
receiving the electrical signals from the subpixels with a data processor and processing the signals from different subpixels to create a range image of estimates of depths of objects across the object field.

33. A method according to claim 32 wherein receiving said light from the converging lens with a plurality of imaging elements comprises receiving said light from the converging lens with a lenticular array.

34. A method according to claim 32 wherein receiving said light from the converging lens with a plurality of imaging elements comprises receiving said light with the imaging elements such that each imaging element receives light from the entire surface of the converging lens.

35. A method according to claim 32 wherein receiving the images formed by the imaging elements further comprises arranging the subpixels of each macropixel of the photodetector array in a similar positional distribution such that a group of subpixels, each from a similar position in a different macropixel, together form a subimage representative of light passing through one region of the converging lens.

36. A method according to claim 35 wherein processing the electrical signals from different subpixels further comprises assembling said subimages and comparing the parallax from one subimage to another in determining depth of objects in the object field.

37. A method according to claim 35 wherein processing the electrical signals from different subpixels further comprises detecting the shift of intensity peaks from one subimage to another in determining depth of objects in the object field.

38. A method according to claim 32 further comprising diffusing said light from objects in the object field with a weak diffuser.

39. A method according to claim 32 further comprising redirecting the light from the converging lens to the imaging elements with a field lens.

40. A method according to claim 32 further comprising redirecting the images from the imaging elements to the photodetector array with a relay lens.

41. A method as claimed in claim 32 wherein the data processor estimates are based on derivatives of local intensity between subimages for patches of macropixels.

42. A method as claimed in claim 41 wherein the estimates are based on derivatives in two dimensions.

43. A method as claimed in claim 32 wherein the data processor applies a weighting mask to the electrical signals generated by the photodetector array in order to adjust the signals for misalignment of the lenticular array with the photodetector array.

44. A method as claimed in claim 32 wherein the data processor processes at least three subimages to determine each depth of an object.

* * * * *